United States Patent [19]

Possati et al.

[11] 4,420,889
[45] Dec. 20, 1983

[54] PLUG COMPARATOR FOR CHECKING THE DIAMETER OF HOLES

[75] Inventors: Mario Possati; Guido Golinelli, both of Bologna; Narciso Selleri, Monteveglio, all of Italy

[73] Assignee: Finike Italiana Marposs S.p.A., S. Marino di Bentivoglio, Italy

[21] Appl. No.: 268,631

[22] Filed: May 29, 1981

[30] Foreign Application Priority Data

Jun. 20, 1980 [IT] Italy ................................. 3436 A/80

[51] Int. Cl.³ ............................................... G01B 3/22
[52] U.S. Cl. ................................. 33/178 F; 33/178 E
[58] Field of Search ............... 33/178 E, 178 F, 168 B

[56] References Cited

U.S. PATENT DOCUMENTS

| | | | |
|---|---|---|---|
| 2,403,546 | 7/1946 | Olsen | 33/178 E X |
| 2,638,681 | 5/1953 | Kinley et al. | 33/178 F X |
| 3,336,555 | 8/1967 | Pastan | 134/166 R |
| 3,808,696 | 5/1974 | Possati | 33/178 E |
| 4,030,202 | 6/1977 | Fadl et al. | 33/178 E |
| 4,077,130 | 3/1978 | Possati | 33/178 E |
| 4,279,079 | 7/1981 | Gamberini et al. | |
| 4,290,204 | 9/1981 | Possati | 33/178 E |
| 4,306,455 | 12/1981 | Selleri | 33/178 E |

*Primary Examiner*—William D. Martin, Jr.
*Attorney, Agent, or Firm*—Stevens, Davis, Miller & Mosher

[57] ABSTRACT

A manual plug comparator for checking the diameter of holes of mechanical parts, comprising a support, a movable measurement unit and a protective casing. The movable measurement unit comprises two movable arms respectively bearing feeler elements which come into contact with the parts to be checked. A position transducer detects the position of the movable arms and is connected by an electric cord to an electric supply, detection and indication group. A base plate fastened to the casing has an opening adapted to permit the introduction of air under pressure into the plug. The flow of air passes through the inside of the plug, removing any foreign matter and emerges through other openings provided in the support.

3 Claims, 10 Drawing Figures

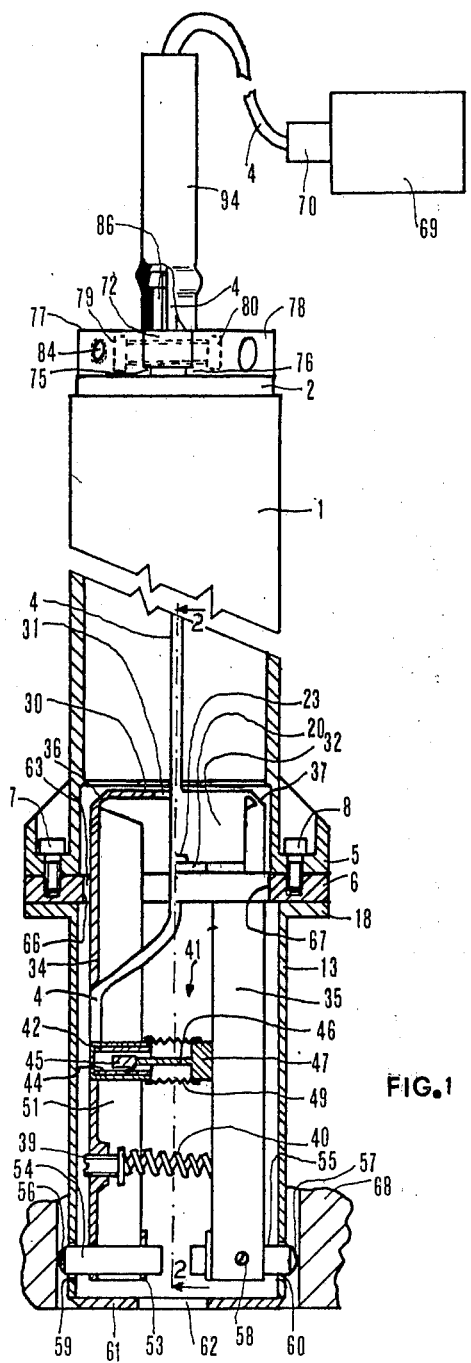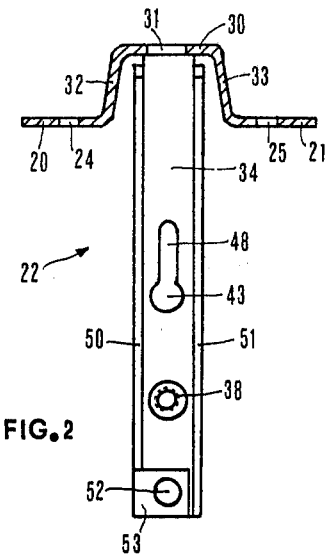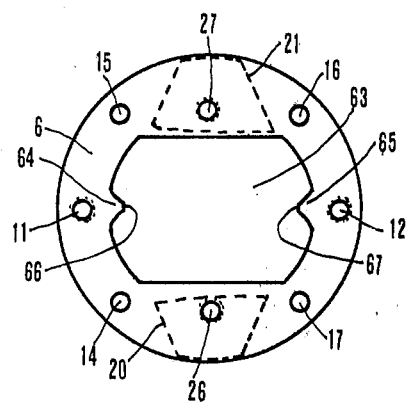
FIG. 1
FIG. 2
FIG. 3

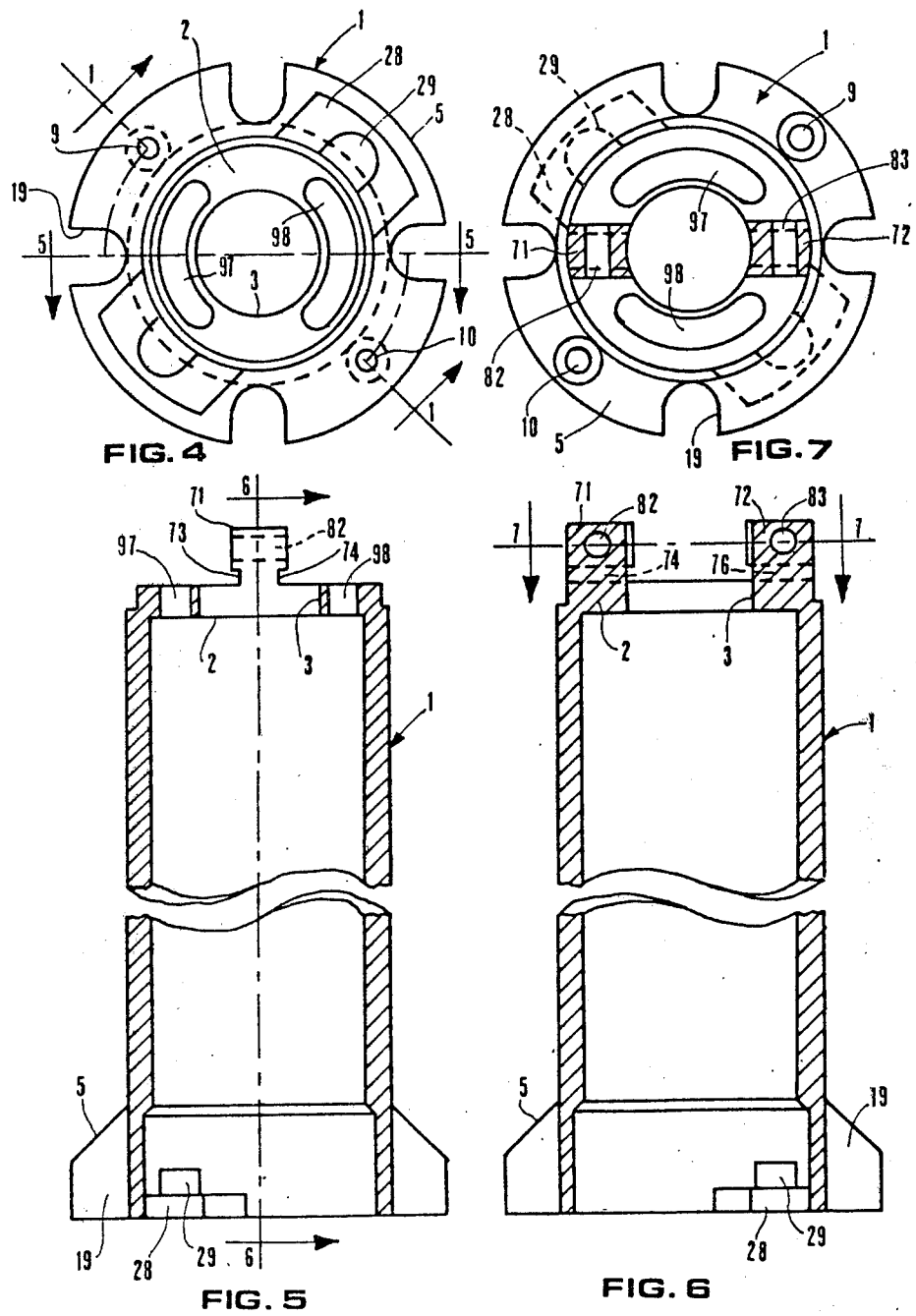

PLUG COMPARATOR FOR CHECKING THE DIAMETER OF HOLES

The present invention relates to a plug comparator for checking the diameter of holes of mechanical parts, comprising support and protection means which define an outer housing, two movable arms supported by the support and protection means, two feeler elements fastened respectively to the movable arms and passing through respective openings in the outer housing to come into contact with diametrically opposite points of the part to be checked, means adapted to permit opening and closing movements of the arms, and transducer means adapted to detect the position of the movable arms.

BACKGROUND OF THE INVENTION

Plug comparators of traditional type comprise a support and protection structure, at least two movable arms with feeler elements passing through respective openings in the support and protection structure, at least one transducer for detecting the position of the movable arms, an electric supply, detection and indication group, and electrical connections between the group and the transducer.

These known comparators have various drawbacks resulting from the possibility of foreign matter, such as grease, dust and chips, accumulating within the plug, after possibly entering into the inside of the comparator through the spaces present between the feeler elements and the surfaces of the respective openings of the support and protection structure. As a result of this, the precision and reproducibility of the measurements or even the very operation itself of the comparator may be jeopardized. It is therefore necessary periodically to take the comparator apart in order to carry out cleaning or repair operations.

SUMMARY OF THE INVENTION

The technical problem which the present invention proposes solving is to provide a plug comparator in which it is possible, in a simple and rapid manner and without the necessity of taking the comparator itself apart, to cary out cleaning operations on the inner parts.

This problem is solved by a comparator of the type indicated at the beginning of the specification, in which, in accordance with the invention, the outer housing has further openings adapted to permit the introduction of a fluid under pressure, flow of the fluid within the housing to remove any foreign matter and discharge of the fluid and foreign matter to the outside of the housing.

BRIEF DESCRIPTION OF THE DRAWINGS

The invention will be described in detail with reference to the accompanying drawings, which are to be understood to be purely illustrative and not limitative and in which:

FIG. 1 is a longitudinal view, partially in section, of a manual plug comparator in accordance with the preferred embodiment of the invention; the partial section being taken along line 1—1 of FIG. 4;

FIG. 2 is a longitudinal sectional view through the movable unit of the comparator of FIG. 1 along the line 2—2 of FIG. 1;

FIG. 3 is a plan view of a support element of the comparator of FIG. 1;

FIG. 4 is a bottom view of a handle of the comparator of FIG. 1;

FIG. 5 is a longitudinal sectional view through the handle along line 5—5 of FIG. 4;

FIG. 6 is a longitudinal sectional view through the handle along line 6—6 of FIG. 5;

FIG. 7 is a top view in horizontal section of the handle along line 7—7 of FIG. 6;

DESCRIPTION OF THE PREFERRED EMBODIMENT

Figure 8:
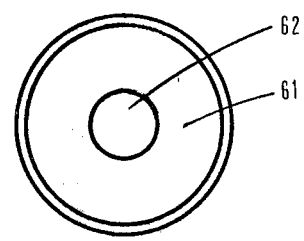
FIG. 8 is a bottom plan view of a base plate of the comparator of FIG. 1.

Referring to FIGS. 1 to 6, the manual plug comparator comprises a handle 1, preferably of plastic material, having an upper base 2 which is perpendicular to the longitudinal axis of the comparator, with a central aperture or hole 3 (FIG. 5) for the passage of an electrical cord 4. The handle 1, which is hollow on the inside, has substantially cylindrical inner and outer surfaces coaxial with the longitudinal axis of the comparator. The lower portion of the handle 1 terminates in a flange 5 which serves to connect the handle to a support element, consisting essentially of a preforated plate 6. The connection between the flange 5 and the plate 6 is effected by means of two screws 7, 8 which pass through holes 9, 10 in the flange 5 (FIG. 4) and are threaded into threaded holes 11, 12 in the plate 6 (FIG. 3) so as to clamp the lower face of the flange 5 against the upper face of the plate 6.

The plate 6 furthermore supports a protection and centering casing 13 by means of four screws, not visible in the drawing, which pass through holes 14, 15, 16, 17 of the plate 6 and are threaded into threaded holes, not visible in the drawing, provided in a flange 18 of the casing 13 in such a manner that the upper face of the flange 18 is clamped to the lower face of the plate 6. The four fastening holes of the flange 18 are accessible through openings 19 in the flange 5 (FIG. 4).

The plate 6 furthermore acts as support element for the movable unit of the comparator since to the upper face of the plate 6 there are connected the lower faces of two flanges 20, 21 (FIG. 2) which form part of a single body 22 with the moving unit. The connection is effected by two screws, one of which, 23, is visible in FIG. 1, passing through holes 24, 25 in the flanges 20, 21 and threaded into threaded holes 26, 27 of the plate 6. In the flange 5 there are provided seats 28, 29 for housing the flanges 20, 21 and the screws 23 (FIG. 4).

The flanges 20, 21, shown partially in dash line in FIG. 3, are opposite each other with respect to the vertical plane passing through the axis of the comparator and through the axes of the holes 11 and 12.

The body 22, obtained by bending a plate of spring steel, furthermore comprises an upper base 30 of substantially rectangular perimeter and with a hole 31 for the passage of the electrical cord 4, two connecting parts 32, 33 between the flanges 20, 21 and the base 30, and two movable arms 34, 35. The arms 34, 35, which are arranged substantially along the longitudinal geometrical axis of the comparator, are obtained by bending two flanges from the steel plate and are connected with the upper base 30 by two portions 36, 37 which are lightened by chamfers, as can be noted from FIG. 1, which form two fulcrums for the rotation of the arms 34, 35 around the respective axes perpendicular to the arms.

The structure of the arms 34, 35 is substantially similar and therefore only arm 34 will be described, with reference to FIGS. 1 and 2. The arms 34 is of a C-shaped cross section so as to present high resistance to flexure and has a threaded hole 38 in which there is threaded a screw 39 (FIG. 1) which supports one end of a spring 40, the other end of which is suitably fastened to the arm 35. The spring 40 works in compression and therefore tends to open the arms 34, 35. The mutual position of the two arms 34, 35 is detected by means of a position transducer 41 with a differential transformer.

The transducer 41 comprises a cylindrical housing 42 inserted into a hole 43 of the arm 34 and fastened to the arm 34.

The housing 42 contains within it the primary and secondary windings of the differential transformer. Within the winding 44 there is movable, as a result of the mutual displacements of the arms 34, 35, a magnetic core 45 supported by a shaft 46 integral with a cylinder 47 fastened to the arm 35. The cord 4 which is connected to the windings 44, emerges laterally from the housing 42 and passes through an opening 48 in the arm 34 communicating with the hole 43. An elastic bellows 49 having its ends fastened to the cylinder 47 and to the housing 42 assures tightness within the transducer 41.

The arms 34, 35, as already stated, are of a C-shaped cross section and therefore have bent flanges 50, 51. The arms 34, 35 house at their free ends, in suitable holes 52 passing through further bent flanges 53, cylinders 54, 55 which bear feelers 56, 57, respectively. The cylinders 54, 55 are locked by screws 58 which make it possible to adjust the radial position of the cylinders and therefore of the feelers 56, 57.

The casing 13 has holes 59, 60 for the passage of the feelers 56, 57 and is closed at the bottom by a circular base or plate 61 perpendicular to the geometrical axis of the comparator. The plate 61, which is fastened to the casing 13 in a manner not shown in the drawing, has a central hole 62.

The plate 6 (FIG. 3) is of substantially ring shape with a central hole 63 and has two inwardly protruding parts 64, 65 having approximately the shape of triangular prisms with chamfered vertices 66, 67. The two parts 64, 65 which are diametrically opposite each other in a direction perpendicular to that in which the two flanges 20, 21 are arranged, form stop surfaces adapted to limit the opening stroke of the arms 34, 35. As a matter of fact, as can be noted also from FIG. 1, the arms 34, 35 pass through the hole 63 since the base 30 and the free ends of the arms are on opposite sides of plate 6. At the level of plate 6, the central portion of the C-shaped section of the arms 34, 35 is adjacent to the vertices 66, 67.

Therefore if the part 68 to be checked shown in FIG. 1 is removed, the opening movement caused by the spring 40 is limited due to the contact of the central portion of the C-shaped section of the arms 34, 35 with the vertices 66, 67.

On the other hand, when the casing 13 is introduced into a hole of a part 68 to be checked, the feelers 56, 57, which in condition of rest protrude with respect to the surface of the casing 13 by a predetermined amount, cause the arms 34, 35 to close, bringing them into a measurement position, and it is possible to read from an instrument of a supply and detection group 69 connected to a connector 70 fastened to the end of the electrical cord 4, the difference between the diameter of the hole and the value of the diameter of a sample part by means of which, as is customary, the zero setting of the comparator is effected.

From the above description it can be noted that a single element, namely the plate 6, acts both as a central support to which there are connected the handle 1, the arms 34, 35 (via the intermediate support element comprising the flanges 20, 21, the base 30 and the lightened sections 36, 37) and the casing 13 and as limiter for the opening stroke of the arms 34, 35.

The limiting of the opening stroke is obtained, as described above, by two parts of the plate or ring 6 which protrude towards the inside and which, terminating with substantially sharp-edged surfaces, define stop surfaces of small size, so as to eliminate the influence of foreign elements which may tend to deposit on the arms 34, 35 or on the stop surfaces 66, 67, and to assure a limiting of the opening stroke to a constant value. The vertices which constitute the stop surfaces may be more or less beveled or sharp, depending on the shape of the arms 34, 35.

The handle 1, above the upper base 2, has two tangs 71, 72 of substantially prismatic shape but with two faces having the shape of parts of cylindrical surfaces of the same diameter as the base 2 of the handle 1. In the lower portion of the tang 71 there are provided two opposite undercuts 73, 74 (FIGS. 5, 6). Similar undercuts 75, 76 are provided in the tang 72 (FIGS. 1 and 6).

Figure 9:
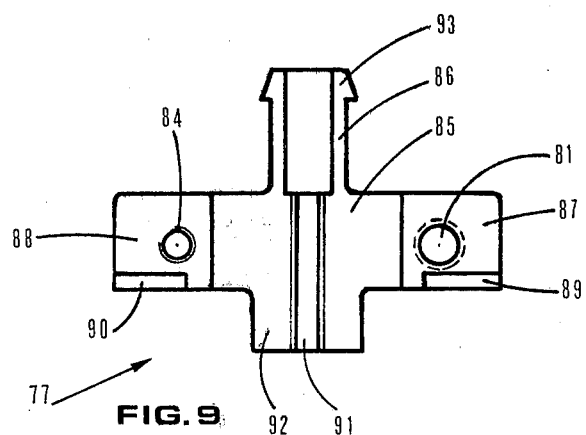
FIG. 9 is a vertical view on a larger scale of an element of a cord-holder device of the comparator of FIG. 1.
Figure 10:
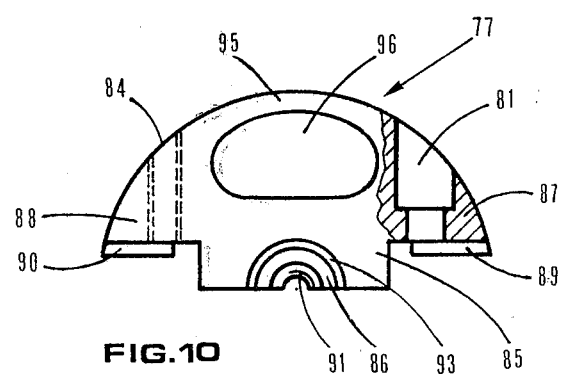
FIG. 10 is a plan view, partially in section, of the element of FIG. 9.

The comparator furthermore comprises a cord-holder device consisting of two elements 77, 78 which are clamped by screws 79, 80 against the tangs 71, 72, as is visible in FIG. 1. The screw 79 passes through a hole 81 in the element 77 (FIGS. 9, 10), a hole 82 in the tang 71 and is screwed into a threaded hole of the element 78. In similar manner, the screw 80 passes through a hole in the element 78 and a hole 83 in the tang 72 and is screwed into a threaded hole 84 of the element 77.

The element 77, which is identical to the element 78, comprises a central body 85, a semi-tubular part 86 and two lateral arms 87, 88. The arms 87, 88 in which holes 81, 84 are present have two teeth 89, 90, adapted to be inserted into the undercuts 73, 75 of the tangs 71, 72, which define stop surfaces cooperating with the teeth 89, 90 so as to prevent displacement of the element 77 in the axial direction of the comparator. Within the central body 85 there is provided a semicylindrical threaded seat 91 coaxial with the semitubular part 86.

When the cord-holder device is mounted, the threaded seat 91 and the corresponding seat of the element 78 grip onto the jacket of the cord 4, which is thus locked in a threaded hole. The crests of the threads penetrate into the jacket so as to prevent displacement of the cord 4 with respect to the cordholder device and the handle 1. The lower part 92 of the body 85 and the corresponding part of the body of element 78 remain housed within the hole 3 of the handle while the lower faces of the side arms 87, 88 of the element 77 and the corresponding ones of the element 78 rest against the base 2 of the handle 1.

The semitubular part 86 and the corresponding part of the element 78 are placed together so as to form an inner hole aligned with the threaded hole formed by the threaded seats of the elements 77, 78. This inner hole has a diameter such that its surface does not grip the jacket of the cord 4. The upper end of the semitubular part 86 terminates with an outer surface 93 having the form of a semifrustoconical surface, with a lower base protruding with respect to the outer underlying surface of the semitubular part 86. Over the outer surface 93 defined by the semitubular part 86 and by the semitubular part of the element 78 there is placed a flexible rubber tube 94 which is locked by the frusto-conical surface defined by the elements 77, 78. The tube 94 serves to rigidify the cord 4, avoiding possible breaks in its jacket in the immediate vicinity of the cord-holder device.

The structure of the cord-holder device is such as to prevent damage to the wires of the cord 4 and to prevent mechanical stresses exerted on the cord from the outside of the comparator from being transmitted to the part of the cord located within the handle 1 and from this part of the cord to the movable arm 34.

As a matter of fact the two elements 77, 78 of the cord-holder device cannot move either axially, due to the teeth 89, 90, nor transversely, due to being abutted against the tangs 71, 72.

The element 77 (and thus also the element 78) has an outer surface 95 which constitutes part of a cylindrical surface of a diameter corresponding to that of the base 2 of the handle, so that the transverse size of the cord-holder device and of the tangs 71, 72 is equal to that of the base 2. In the element 77 there is provided a hole 96 of substantially elliptical section which communicates with the hole 97 provided in the upper base 2 of the handle 1. Another hole 98 provided in the base 2, symmetrical with respect to the hole 97 and adjacent, like hole 98, to the central hole 3, communicates with a hole provided in the element 78 corresponding to hole 96.

The presence of the holes 62, 96, 97, 98 makes it possible to clean the inside of the comparator without it being necessary to remove any part. As a matter of fact, by means of a nozzle inserted through the hole 62 it is possible to introduce air or other suitable fluid under pressure within the internal chamber defined by the protective and support housing formed by the casing 13 with the plate 61, plate 6 and handle 1. The air flows within the plug substantially from the bottom to the top passing through the inside of the casing 13, hole 63, and handle 1. The air flow removes any foreign matter, and discharges towards the outside together with the foreign matter through the holes 96, 97, 98. The air discharges in part also through the free annular spaces defined by the cylinders 54, 55 and by the surfaces of the holes 59, 60. The simplicity of this cleaning operation is such that it can be repeated frequently in such a manner as to have assurance that the parts thereof critical for the operation, such as the cylinders 54, 55, the stop surfaces 66, 67, the arms 34, 35, the spring 40, and the portions 36, 37, do not accumulate foreign matter in such an amount as to jeopardize the precision and the reproducibility of the measurements, or cause oxidation of the surfaces. The transducer 41, being tightly closed by the gasket 49, does not suffer from this cleaning operation with compressed air.

The hole 3 of the handle 1 has a diameter such as to permit, after the disconnecting of the connector 70 from the group 69, the dismounting of the cord holder device and the unscrewing of the screws 7, 8, the withdrawal of the handle 1 by passing over the cord 4 and the connector 70. In this way the assembly and disassembly of the comparator are facilitated and it is possible to assemble the comparator by easily and rapidly connecting its various assembled components together, one of which is the handle and another of which is the movable unit provided with transducer, cord and connector.

If mechanical stresses are applied to the handle 1 or to the part of the cord 4 which emerges from same through the cord-holder device, these stresses are not transmitted to the movable measurement unit since the stresses act only on the plate 6 and on the cord-holder device. This also is important for the purposes of the reproducibility of the measurements effected by the comparator.

It is obvious that the main characteristic of the invention, which consists in the presence of holes adapted to permit effecting a cleaning operation within the comparator without the necessity of disassembling the comparator itself, can be provided in comparators of a type different from that shown in the figure, for instance in plug comparators used for checks in transfer machines. In those comparators, which may have several pairs of measurement arms and which are brought into measurement position automatically, instead of by a handle there is a mandrel within which there may be one or more openings to permit the discharge of the air.

It is obvious that other changes or variations which are equivalent from a functional or structural standpoint may be made in the comparator shown in the drawings without thereby going beyond the scope of the invention.

What is claimed is:

1. A manual plug comparator for checking the diameter of holes of mechanical parts, comprising,
    a support plate defining first and second sides and at least a through hole;
    an integral body including: a first section coupled to the support plate; two lightened portions connected to the first section and defining relevant fulcrum devices; and two further sections, each defining a relevant movable arm, connected to the lightened portions for rotation movement about the relevant fulcrum devices;
    two feelers coupled to the movable arms, respectively, for contacting the part to be checked;
    transducer means coupled to the movable arms for providing a signal responsive to the mutual position of the movable arms, the transducer means including two transducer elements coupled to the movable arms, respctively, each transducer element and each feeler being coupled to the relevant movable arm on the same side with respect to the relevant fulcrum device;
    a hollow handle coupled to the support plate;
    a protective nosepiece coupled to the support plate and defining with the handle a geometrical longitudinal axis of the plug comparator, the nosepiece substantially housing the arms, the arms being substantially arranged along said longitudinal axis and passing through said through hole of the support plate, the nosepiece further defining two openings for the passage of the feelers;
    wherein the handle, the support plate and the nosepiece define an internal chamber and the handle and the nosepiece have bases spaced along said longitudinal axis, these bases defining further openings for carrying out a cleaning operation inside said chamber by introduction of a pressurized fluid through one of said further openings, the flow of the fluid within the chamber, substantially along said longitudinal axis, for removing any foreign matter, and the discharge of the fluid to the outside of the plug comparator.

2. A manual plug comparator for checking the diameter of holes of mechanical parts, comprising:

a support element defining a first opening;

a hollow handle having an open end coupled at a side of the support element and another end with a second opening;

measurement means including: two arms movably supported by the support element for rotational movements; two feelers respectively fixed at relevant ends of the arms; and a position transducer operatively coupled to the arms for providing a signal indicative of the mutual position of the arms, the transducer including sealing means for providing sealing of the transducer; and a hollow protection and centering casing having an open end coupled to the support element at a side thereof opposite to that where is coupled the hollow handle, the casing housing partially said arms and having two holes for the passage of said ends of the arms, the casing having another end with a third opening, wherein the support element, the handle and the casing define a geometrical longitudinal axis of the plug comparator and said first, second and third openings are spaced along said longitudinal axis and are adapted to permit a cleaning operation of the plug comparator by introduction of a pressurized fluid through one of said second and third openings, the flow of the fluid substantially along said longitudinal axis for removing any foreign matter and the discharge of the fluid to the outside of the plug comparator through the other of said second and third openings.

3. A manual plug comparator for checking the diameter of the holes of mechanical parts, comprising:

a support element defining a first opening;

a hollow handle having an open end coupled at a side of the support element and another end with a second opening;

measurement means including: two arms movably supported by the support element for rotational movements; two feelers respectively fixed at relevant ends of the arms; an electrical position transducer operatively coupled to the arms for providing a signal representative of the mutual position of the arms; the transducer including sealing means for providing sealing of the transducer; and an electrical cord connected to the transducer;

a cord locking device fixed at said another end of the hollow handle, for locking a portion of the cord with respect to the handle, the locking device defining a third opening communicating with said second opening; and a hollow protection and centering casing having an open end coupled to the support element at a side thereof opposite to that where is coupled the hollow handle, the casing housing partially said arms and having two holes for the passage of said ends of the arms, the casing having another end with a fourth opening, wherein the support element, the handle and the casing define a geometrical longitudinal axis of the plug comparator and said first, second, third and fourth openings are spaced along said longitudinal axis and are adapted to permit a cleaning operation of the plug comparator by introduction of a pressurized fluid through one of said third and fourth openings, the flow of the fluid substantially along said longitudinal axis for removing any foreign matter and the discharge of the fluid to the outside of the plug comparator through the other of said third and fourth openings.

* * * * *

UNITED STATES PATENT AND TRADEMARK OFFICE
CERTIFICATE OF CORRECTION

PATENT NO. : 4,420,889

DATED : December 20, 1983

INVENTOR(S) : Mario POSSATI et al.

It is certified that error appears in the above—identified patent and that said Letters Patent is hereby corrected as shown below:

Title Page, under Section [30], change "20" to --2--;
Title Page, under Section [56], insert --FOREIGN PATENT DOCUMENTS
   1,535,816  7/1968   France --.
Column 1, line 46, change "cary" to --carry--.
Column 2, line 29, change "preforated" to --perforated--.
Column 3, line 7, change "arms" to --arm--.
Column 6, line 47, change "respctively" to --respectively--.
Column 7, line 37, cancel "the".

Signed and Sealed this

Twelfth Day of June 1984

[SEAL]

Attest:

GERALD J. MOSSINGHOFF

Attesting Officer

Commissioner of Patents and Trademarks